United States Patent
Maas et al.

(10) Patent No.: US 6,845,213 B2
(45) Date of Patent: Jan. 18, 2005

(54) METHOD FOR DETECTING AND IDENTIFYING TIME-CONSTANT PATTERNS IN VIDEO SIGNALS OF ANY VIDEO SOURCE, PARTICULARLY FOR THE DETECTION OF ADVERTISING SPOTS IN TELEVISION BROAD-CASTINGS, AND DEVICE FOR PERFORMING SUCH A METHOD

(76) Inventors: Mike Maas, Föhrer Strasse 10, D-13353 Berlin (DE); Christoph Sowa, Zum Kniepbusch 2, D-52511 Geilenkirchen (DE); Werner Stange, Birkenwerderstrasse 30b, D-13439 Berlin (DE)

( * ) Notice: Subject to any disclaimer, the term of this patent is extended or adjusted under 35 U.S.C. 154(b) by 894 days.

(21) Appl. No.: 09/772,045

(22) Filed: Jan. 29, 2001

(65) Prior Publication Data

US 2001/0016943 A1 Aug. 23, 2001

(30) Foreign Application Priority Data

Jan. 31, 2000 (DE) .......................................... 100 04 131
Feb. 15, 2000 (DE) .......................................... 100 06 692
Jul. 28, 2000 (DE) .......................................... 100 36 882

(51) Int. Cl.$^7$ ................................................ H04N 5/91
(52) U.S. Cl. ........................... 386/46; 386/52; 348/571; 706/20
(58) Field of Search .............................. 386/46, 83, 95, 386/94, 52, 48; 348/571, 722; 706/20; H04N 5/91

(56) References Cited

U.S. PATENT DOCUMENTS

| | | | | |
|---|---|---|---|---|
| 5,343,251 A | * | 8/1994 | Nafeh | 348/722 |
| 5,455,892 A | * | 10/1995 | Minot et al. | 706/20 |
| 5,550,965 A | * | 8/1996 | Gabbe et al. | 345/723 |

(List continued on next page.)

FOREIGN PATENT DOCUMENTS

| | | | |
|---|---|---|---|
| DE | A1-42 04 689 | 8/1993 | H04N/5/782 |
| DE | A1-43 03 942 | 8/1994 | H04N/5/00 |

(List continued on next page.)

OTHER PUBLICATIONS

"Weg mit 'Ruf . . . mich . . . an'",section "NoAd", Peter Richet et al. in c't 1999, No. 13, p. 199 to 200.

(List continued on next page.)

Primary Examiner—Vincent Boccio
(74) Attorney, Agent, or Firm—Gifford, Krass, Groh, Sprinkle, Anderson & Citkowski, P.C.

(57) ABSTRACT

The invention relates to a method for detecting and identifying time-constant patterns in video signals of any video source, particularly for automatically identifying advertising spots in television broadcastings or the like transmissions by video signal analysis. The invention further relates to a device for performing such a method and to a special use of such a method. Regarding the method at least one predetermined picture section of running-in video signals is written as brightness matrix into a picture storage; the border courses of the actual picture section are determined in the form of a directional field from the brightness matrix and buffered as directional field matrix, and by comparison of directional field matrixes of subsequent pictures of the same picture section with the buffered matrix, time-constant portions are identified wherein based on the time-constant portions of the directional field a modified directional field matrix is determined for further comparison measurements; if a sufficient time-constant pattern could not be identified, it is switched over to further picture sections for further reference measurements; after the successful determination of the reference matrix by comparison of the directional field matrixes of subsequent pictures of the same picture section with the reference matrix by means of statistical methods information regarding the further presence or absence of time-constant patterns can be derived.

18 Claims, 11 Drawing Sheets

U.S. PATENT DOCUMENTS

| | | | |
|---|---|---|---|
| 5,668,917 A | * | 9/1997 | Lewine .................. 386/52 |
| 5,812,732 A | * | 9/1998 | Dettmer et al. ............. 386/48 |
| 6,133,946 A | * | 10/2000 | Cavallaro et al. ........... 348/135 |

FOREIGN PATENT DOCUMENTS

| | | | |
|---|---|---|---|
| DE | A1-44 17 481 | 10/1994 | ............ H04N/5/44 |
| DE | C1-43 28 915 | 12/1994 | ............ G06K/9/56 |
| DE | A1-295 11 499 | 11/1995 | ............ H04N/5/025 |
| DE | C2-195 28 344 | 3/1996 | ............ H04N/5/782 |
| DE | A1-195 15 604 | 10/1996 | ............ H04N/5/782 |
| DE | A1-197 54 252 | 6/1999 | ............ H04N/5/775 |
| DE | A1-198 07 765 | 9/1999 | |
| DE | A1-100 36 882 | 7/2000 | ............ H04N/5/44 |

OTHER PUBLICATIONS

Thorsten Janke et al., "Optimierung und Implementierung eines Systems zur Unterdruckung von Werbeblocken bei Aufzeichnungen mit dem Videorecorder", Sep. 20, 1999, No translation.

* cited by examiner

Before correction

After correction

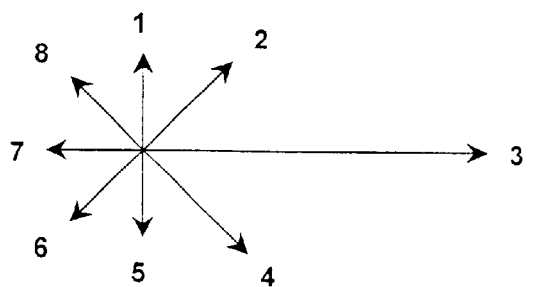
Fig. 4
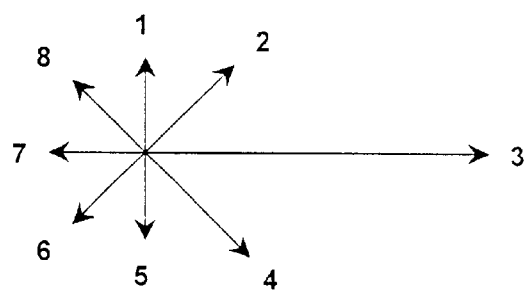 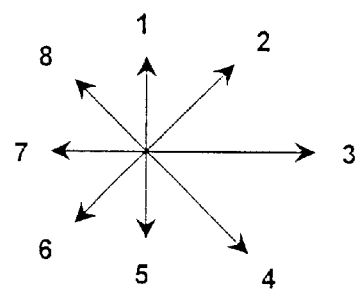
Fig. 5A                Fig. 5B

US 6,845,213 B2

METHOD FOR DETECTING AND IDENTIFYING TIME-CONSTANT PATTERNS IN VIDEO SIGNALS OF ANY VIDEO SOURCE, PARTICULARLY FOR THE DETECTION OF ADVERTISING SPOTS IN TELEVISION BROAD-CASTINGS, AND DEVICE FOR PERFORMING SUCH A METHOD

FIELD OF THE INVENTION

The invention relates to a method for detecting and identifying time-constant patterns in video signals of any video source, particularly for the automatic detection of advertising spots in television broadcastings or the like transmissions by means of an analysis of the video signals, to a special use of such a method as well as to a device for performing such a method.

BACKGROUND OF THE INVENTION

Private and nowadays increasingly also television broadcasting institutions under public law use nearly every possibility to earn money by fading in advertising spots during any interruption of the program. Not only the duration and the frequency of such advertising spots faded-in but also the time moments at which the current program is interrupted are annoying for many spectators.

The invention presented herein is in a position to automatically identify advertising spots in television broadcastings and to control nearly every device depending on the identification of advertising spots through any bus system or by infrared instruction sequences. Thus, for example video recordings without any advertisement may be realized by switching a video recorder through respective control commands in the beginning and at the end of an identified advertising sequence.

DESCRIPTION OF THE PRIOR ART

Method and devices are already known which should enable an identification of advertising spots in television (TV)-broadcastings, and on the basis of which a system for suppressing advertising sequences should be realized in connection with a video recording. A part of these methods is based on the fact that television channels are to be inspected by persons within a central monitoring means, and control commands are to be sent out to a decoder box at the customer. The other part of the methods is based on circuit arrangements which are either directly integrated into the video recorder or designed like additional device and which ought to permit a fully automatic identification of TV-advertising sequences by means of a definite feature present in the television signal.

First of all, a short survey over the development stage of methods for identifying advertising spots in the past and video circuit systems based thereon is given in the following:

From DE 195 15 604 A1 a method for controlling a video recorder depending on an identification marking of the transmission format included in television signals is known. The solution proposed therein starts from the principle that advertising broadcastings are not produced in the so-called PALplus-format. If during a PALplus-broadcasting a normal PAL-signal is identified this signal will be defined as undesired advertisement and a connected video recorder is switched on pause. The problem with this method is based on the fact that, up to now, nearly no broadcasting is radiated in the PALplus-format such that this method is irrelevant in the moment.

Moreover, methods which are for example described in DE 295 11 499 U1 and which ought to distinguish feature films in the large screen format from advertising spots by means of the black limiting zones do not provide a generally satisfactory solution. In the moment, only a small percentage of radiated television broadcastings are feature films in the large screen format (in Germany about 8%).

A circuit arrangement for suppressing advertising images during the video recording of a television broadcasting is also described in DE 42 04 689 A1. In order to distinct the broadcasting to be recorded from advertising spots the presence of a so-called telestation emblem is checked which normally disappears completely or partly during an advertising interruption. For the detection of such a telestation emblem the brightness values of predetermined portions of a picture line are integrated over a certain period of time (about 5 seconds) and are analyzed thereafter. If the result exceeds a certain threshold value the presence of a telestation emblem in this picture area is assumed. Depending on this feature identification an instruction sequence transmitter in the form of an adaptive remote control for controlling a video recorder is then to be activated. This procedure is obviously based on the assumption that a telestation emblem is characterized by specially high brightness values with respect to its picture context. Thus, colored or even dark telestation emblems cannot be used with this kind of advertising identification. The main criticism regarding this method is however based on the fact that most of the telestation emblems are transparent and therefore have variable brightness values. A reliable advertising identification by means of brightness threshold values is therefore not possible. Moreover, the problem of the control of the video recorder remains unsolved as it is explained later, even if it appears that by means of an adaptive remote control a solution which may simply be realized could be found.

For the identification of advertising spots in television broadcastings there is also referred to the detection of telestation emblems in DE 44 17 481 A1. Specifically, the video signal is here first of all digitized, the digital signal being subjected to a special feature analysis. The means for the feature identification verify among other things the display lines in that whether these lines are completely or at least partly composed only of picture elements which do not vary with respect to their luminance information and/or color information over a longer period of time. If such points are present it can be concluded from this method that either a telestation emblem is present or that a black zone is existent, i.e. a feature film in the large screen format. In both cases the picture elements found are stored for subsequent checks. If the luminance information and/or the color information of the picture element found before are changed an advertising sequence is derived, and a joined control logic is to switch the video recorder on pause. Like with the DE 42 04 689 A1 there are the same points of criticism with respect to this method. Telestation emblems are transparent in many cases and, therefore, can at least not reliably been identified by this method. Moreover, the control logic for externally controlling a video recorder is not explained in detail such that this method will probably not been suited for practical use.

In DE 43 03 942 A1, DE 195 28 344 C2, DE 197 54 252 A1 and DE 198 07 765 A1 it is referred to the aspect that within a central monitoring institution all television channels are to be inspected by persons round the clock and that in case of an identified advertising sequence certain commands are emitted in a transmission form independent from the television signal. A special decoder box at the customer should finally be in a position to receive these signals and to control the video recorder accordingly. The central problem is the controlling of the video recorder by the decoder box.

Regarding all solution proposals which are provided as additional devices for the external controlling of a video recorder, the question remains unanswered how the video recorder may by switched for the purpose of video recording free of advertisement. An external controlling of the video recorder appears to be possible only by infrared-remote control commands. For this purpose some methods are provided with an adaptive remote control which may be programmed with the commands for the start of the recording and the stop of the recording. This solution appears to be practicable on a first view, many problems have however been neglected in this connection.

Nowadays, many video recorders for example switch from the pause-mode into the stop-mode after some minutes of an interruption of the recording, and many devices finally switch into the standby-mode after a further short period of time. It is common that a recording start may be performed starting from all three different operation modes with different instruction sequences. Thus, a stored instruction sequence for the recording start will not always lead to the desired result.

A further problem may arise with time programmed or timer programmed video recordings. In order to prevent an erroneously interruption of the recording most of the video recorders cannot be controlled by infrared commands in this recording mode. In case of a timer programmed video recording the additional device should moreover be in a position to automatically detect the starting time of a video recording in order to simultaneously start with the advertising identification. This problem is not mentioned just as little as the disconnection of the video recorder and the advertising identification system at the end of the recording.

All the mentioned problems regarding the controlling of a video recorder and the many insufficiencies of the system with respect to the advertising identification reveal that, up to now, a satisfactory solution could still not be found which could guarantee a reliably operating advertising identification system and video switch system or video controlling system.

Furthermore, a thesis for diploma from the technical high school in Münster, technical section electrical engineering, having the title "optimization and implementation of a system for suppressing advertising blocks with respect to video recorder recordings" of autumn 1999 is known. This thesis for diploma is concerned with the possibilities of recording television broadcastings without advertisement with the video recorder. For the identification of advertising blocks different algorithms based on an optical detection of the emblem are presented, implemented into a software solution, tested and evaluated. Based on the K-develop-engineering environment under Linux an open-source C++ program was created which ought to record feature films by means of the emblem identification without any advertising, which however has still considerable deficiencies regarding its identification reliability and which like the other presented methods and devices does not represent a really practicable solution with respect to the recorder controlling.

SUMMARY OF THE INVENTION

It is therefore an object of the present invention to present as well a method which is in a position to reliably identify advertising spots in television broadcastings or the like transmissions in order to switch any device, particularly a video recorder, depending on this advertising identification, a special use of this method as a device for performing the method.

The invention is to comprise the following aims or objects as against other methods:

The method ought to reliably identify television advertising due to a feature provided in the video signal and should not be limited to special cases like for example the identification of a particular feature film format.

The method should clearly differ regarding its reliability from the completely automatic methods for advertising identification known so far. Even if the transmitter reception is disturbed, no defective identification should appear.

The arrangement should be in a position to switch nearly every device, even a video recorder in the timer-programmed recording mode by control commands over a bus system or per infrared.

The arrangement should be in a position to autonomously find out the beginning of a timer-programmed video recording in order to then activate itself from a power saving operation mode and to start with the advertising identification.

The arrangement should further be in a position to autonomously find the end of a video recording in order to stop as well the video recorder as also itself and to pass into a power saving standby-mode, subsequently also called sleep-mode.

The device should be realized with a hardware-expenditure as low as possible.

These and other objects are solved by a method for detecting and identifying time-constant patterns in video signals of any video source, particularly for the detection of advertising spots in television broadcastings or the like transmissions, by video signal analysis and determination of video signals, like emblems, being specific for the respective telestation, comprising the following steps:

(a) after testing the activity of the video source at least one determined picture section is read-in into a storage in digitized form as brightness matrix;

(b) the border courses of the actual picture section are determined in the form a directional field from the brightness matrix read-in before and are stored as directional field matrix;

(c) by comparison of the directional field matrixes of subsequently read-in pictures of the same picture section with the stored directional field matrix the time-constant portions of the directional field are determined;

(d) if a sufficient time-constant pattern could not be identified the method steps (a) to (c), in the following called reference measurement, are repeated with respect to a new picture section;

(e) the time-constant portions of the directional field determined after the end of a certain number of comparison measurements are stored for reference as modified directional field matrix and are used for further comparison measurements;

(f) by comparison of the directional field matrixes of subsequent pictures of the same picture section with the directional field matrix stored as reference the further presence or absence of the time-constant pattern is derived by means of statistical methods.

These and other objects are solved by use of a method mentioned before for finishing digitally or analogly stored video data by means of a personal computer or the like calculating device and/or for automatic logging of advertising spots.

These and other objects are solved by a device for performing such a method, comprising a digital signal processor connected to a video source is provided for data analysis, data storage as well as for controlling the input and output of signals, which processor is connected to a permanent storage for storing the function code and remote control command data and is designed in such a way that the processor performs a signal evaluation of picture sections based on a program stored in the permanent storage and provides a switching signal at its output.

Further advantageous embodiments of the present invention are mentioned in the sub-claims.

Before the invention is described in detail, first of all, a short surview is given:

The invention operates on the basis of a detection of emblems of the specific telestation. The method according to the present invention starts from the observation that TV-transmitting stations designate their respective transmission by the fading-in of a station typical emblem or logo in one of the four display corners and that this designation is completely or partly missing during an advertising interruption. Starting from the fact that form, size and position of a telestation emblem are time-invariant, i.e. constant, the data of a digitized video signal are continuously read-in and analyzed by pattern identification algorithms within the so-called reference measuring time. From the plurality of pictures read-in one after the other the directions of the border course of the emblem are filtered by means of statistical methods and stored for comparison purposes. In the subsequent test measurement the further presence of the telestation emblem is checked by a comparison of the similarity of subsequent pictures with the stored reference pattern in order to find out advertising interruptions by means of this identification feature. Since neither color, nor luminance, but directions of the border course are analyzed according to the present invention, also transparent telestation emblems may be used for advertising identification by means of this method.

Moreover, a circuit arrangement operating on the basis of this method, subsequently called device, is described for the controlling of the apparatus dependant from advertising. Specifically, a device for controlling a video recorder is particularly considered. This device has the purpose to identify advertising sequences already during the recording of the television broadcasting and in case to interrupt the video recording. The device may be designed on the one hand as a structural component integrated into the video recorder, on the other hand also as additional device. The additional device is simply connected to the video output of the recorder and then automatically takes over the controlling of the recording with the beginning of the recording. For this purpose the device comprises as well an infrared transmitting unit as also an infrared receiving unit by means of which any remote control commands may be stored and again issued depending on the advertising identification at a given time. Alternatively the controlling of a video recorder is also possible over any bus system. A further aspect according to the present invention may result from the possibility of a data exchange via SCART-bus. According to the intensively used P50-standard for instance timer data of a video recorder may be read-out and also be changed.

Video recordings may hence advantageously be controlled by manipulation of the starting time or stopping time of the recording.

According to the present invention the method for advertising identification may also be used as a basis for a program for finishing digitally recorded TV-broadcastings which have been stored on a re-inscribable DVD or the like medium. The program reads-in the picture data from a corresponding drive, analyzes these data and erases identified advertising sequences within the video recording or copies these data from one storage into another.

Furthermore, a program for automatically tracing advertising spots may be realized by means of the method according to the present invention. This program may store as well the transmission place, the transmission date as also the context in which a certain advertising spot has been broadcasted.

According to the primary basis of the present invention a predetermined picture section of a running-in video signal is digitized after an activity test of the video source by a picture processor or by an A/D-converter, and the luminance values resulted therefrom are recorded into a storage as so called brightness matrix. By taking the mean over several brightness matrixes of the same picture section read-in one after the other interferences in the form of picture noises are first of all reduced. In the case that a digital video source is provided as well the digitizing process as also the taking-the-mean procedure may be omitted.

From the resulting brightness matrix the border courses in the actual picture section are determined and stored in the form of a directional field as matrix by means of an image processing program running in the digital signal processor. By a comparison of the matrixes of the directional field of subsequent images of the same image section with the matrix of the directional field already stored time-constant portions in the stored matrix of the directional field are evaluated or determined without delay. After a predetermined number of measurements the time-constant portions of the directional field are stored as revised matrix of the directional field for reference purposes and referred to for further comparison measurements.

The reference measurement implemented in the method is dynamic, this means that the needed time may differ although the number of measuring cycles is determined. This goes back to the fact that image sequences in which the image information is substantially not changed, are included into the reference measurement only with one single image, respectively. Even those foreign borders may be eliminated thereby which would otherwise have been resulted from the reference measurement as an undesired time-constant pattern.

As soon as time-constant portions of the stored matrix of the directional field are fallen within the reference measurement below a certain level, a further reference measurement will be started in a new display section, and the predescribed procedure starts from the beginning. Thus, in contrast to the known prior art, all display corners are not simultaneously tested, but a sequential sweep of the display corners takes place with respect to the telestation emblem.

The matrix of the directional field obtained according to the reference measurement and cleared from all foreign borders is then used in respect of the following test measurement. It is the object of the test measurements to determine the further presence of the telestation emblem in the image section which has been found out to be relevant in order to perform a device controlling dependant from advertising.

For that purpose the matrixes of the directional field of the picture section to be evaluated are continuously compared with the matrix of the directional field stored as reference. In analogy with the forming of an integral with respect to path the sum of the angular deviations of the respective elements of the actual matrix of the directional field is therefore formed with respect to the reference-matrix of the directional field. The average angular deviation formed by this sum is a quantity or measure for the probability of the presence of the telestation emblem.

As mentioned before the method for identifying advertising spots may also be used for finishing digitally recorded videos for example in order to later eliminate advertising sequences or to detect and to analyze the broadcasted advertising spots for statistical purposes.

Regarding the device the video source is connected through an image processor to a signal processor. The image processor digitizes picture sections of the video signal of the video source after invocation by the signal processor and formats these signals. After request by the signal processor the correspondingly processed signals are transmitted to the latter, the signal processor performing the signal evaluation by means of a digital image processing program deposited in a permanent storage. The signal processor supplies the switch signal at the output, for example for running a video recorder such that this apparatus automatically interrupts the recording procedure in advertising pauses.

According to an embodiment of the present invention there is the additional possibility to also conduct the audio signal output of the video source to the signal processor in order to obtain an additional signal for the identification of an advertising interruption by means of a level evaluation.

The device according to the present invention may be used as a separate so-called (external) additional structural component but may also be integrated already on the side of the hardware into a video recorder or another storage apparatus. In the first case the device is connected to the output of any video source by a plug-connection in the kind of a scart-, cinch- or similar principle. The respective device conducts the video signal again to outside over a further, second interface.

The device is in a position by means of the integrated infrared transmitting and receiving unit to learn and to emit the instruction sequences for the controlling of the device depending on the advertising identification. Additionally or alternatively to the control through infrared commands there is also the possibility to transmit commands and/or data to the apparatus to be controlled over existing bus systems. A completely new idea in this respect is based on a data exchange via SCART-bus. According to the widespread P50-standard timer data of a video recorder may for instance be read-out and may also be changed. By manipulation of the recording starting or stopping time video recordings may purposefully be controlled. During this procedure the control logic of the recorder itself provides for the correct behavior when the timer stopping time is reached.

Specifically the arrangement for identifying time-constant patterns in video signals of any video source comprises a memory component, for example a flash memory, for permanently storing function code and remote control command data, an image processor for digitizing analog video signals if necessary, and a digital signal processor for data analysis, data storage as well as for the input and output of signals over corresponding ports. In case of an external apparatus an infrared transmitting and receiving unit is provided for controlling the apparatus.

After a start of the system and an automatic function test of all components the device according to the present invention remains in a power saving standby-status, also called sleep-mode, up to the activation by valid video signals. After identifying such signals an automatic change-over into the active mode takes place resulting into the performance of the presented method for identifying advertising sequences in TV-programs or the like video transmissions.

In the beginning and at the end of the advertising identification process the device transmits a command for initializing or switching off the process or the device to be controlled through the infrared transmitting unit and/or an activated or connected bus interface. Moreover, in the beginning and at the end of an identified advertising sequence corresponding control commands are emitted.

The arrangement of the infrared transmitting and receiving unit for the purpose of the device controlling dependant from advertising identification comprises at least five memory locations for storing infrared command sequences or provides same from which each may store at least one, preferably three different infrared commands through the infrared receiving unit and may transmit same one after another through the infrared transmitting unit. The infrared command sequences may adaptively be input through a common remote control.

DESCRIPTION OF THE DRAWINGS

A better understanding of the invention will be reached by reference to the following detailed description of preferred embodiments when read in conjunction with the accompanying drawings in which:

FIG. 4 is a graphic representation for the determination of the local border direction Ar[i][j] consisting of the eight different directional gradients;

FIG. 5A, 5B is a graphic representation for the determination of the statistical weighting factor Ag[i][j] on the basis of the difference of the two greatest directional gradients;

DETAILED DESCRIPTION OF PREFERRED EMBODIMENTS OF THE INVENTION

The method for detecting and recognizing time-constant patterns in video signals of any video source may be subdivided into two different measuring phases. In the first phase a time-constant pattern is to be find which may be interpreted as telestation emblem. This phase is called reference measurement in the following and is shown in the form of a flow chart in FIG. 13. In the second phase the further presence of the time-constant pattern resulting from the reference measurement is checked. This phase called test measurement and shown in FIG. 14 in the form of a flow chart represents the real advertising identification. In order to describe the method also in connection with the control of the apparatus depending on the identification of advertising it is started in the following from a device for controlling a video recorder.

Figure 13:
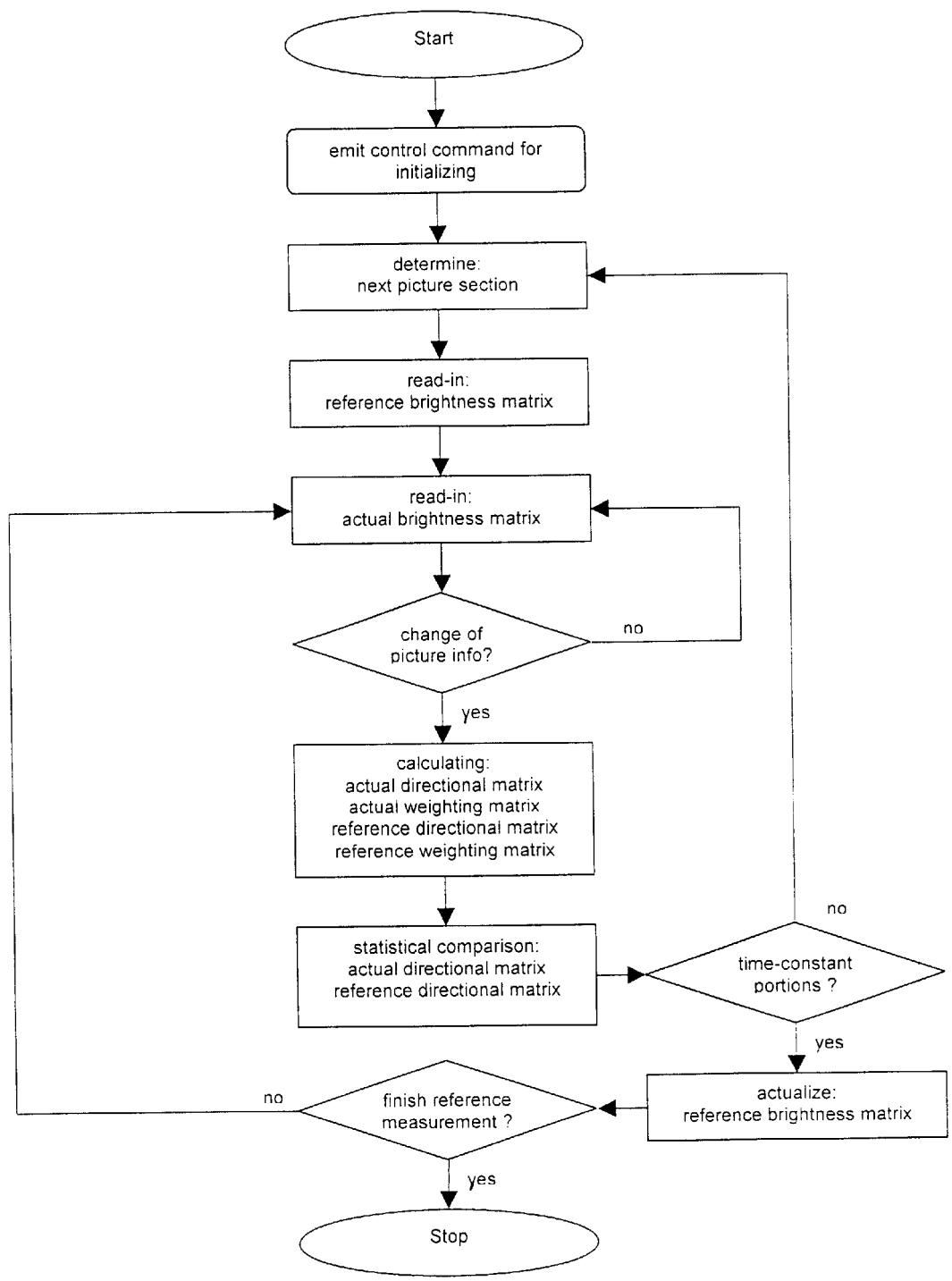
FIG. 13 is a flow chart with respect to the run of the reference measurement.
Figure 14:
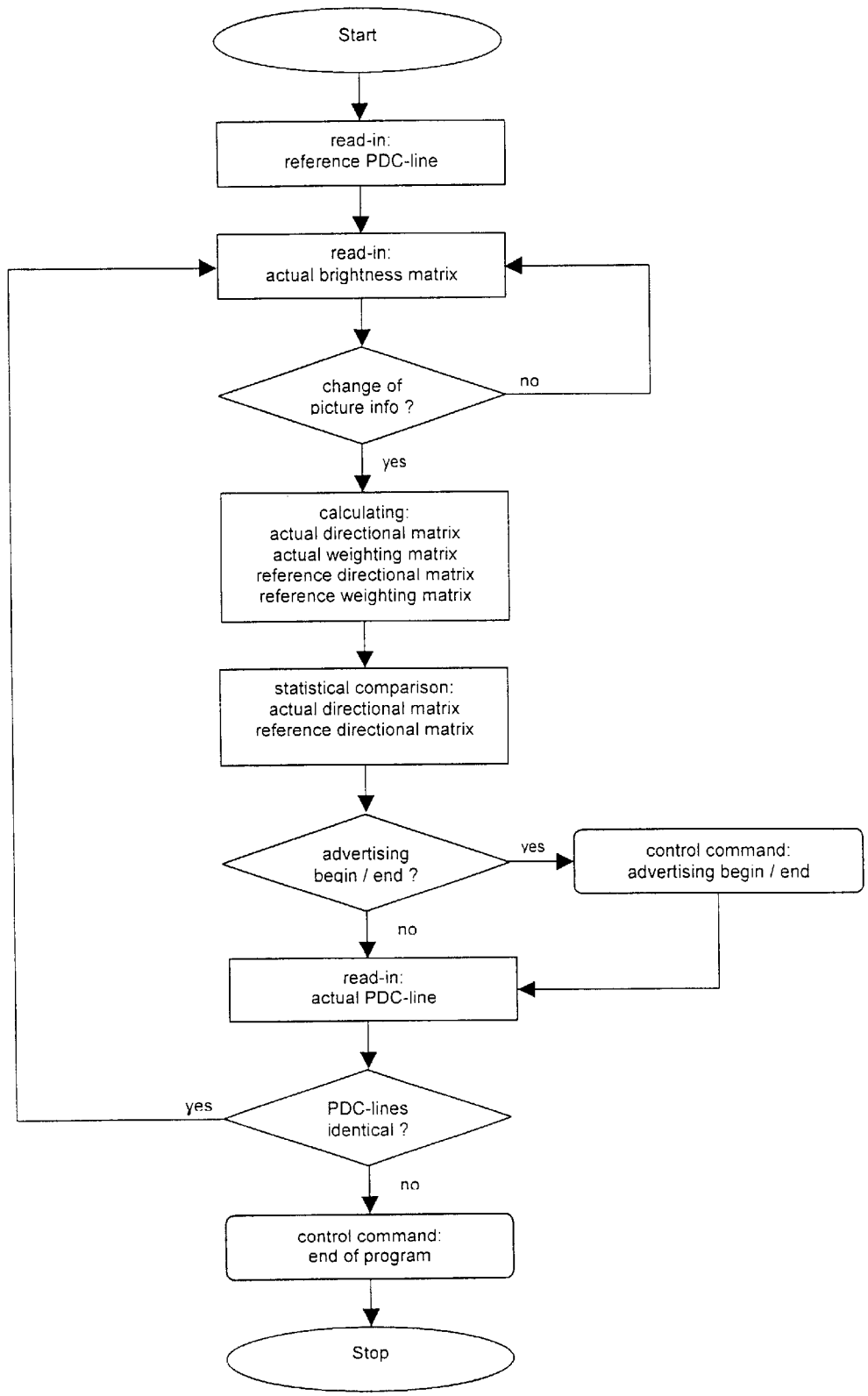
FIG. 14 is a flow chart with respect to the run of the test measurement.

It is the object of the reference measurement according to FIG. 13 to detect telestation emblems in digitized video signals. For this purpose the border courses of an image section are checked over a certain period of time in order to detect time-constant portions by means of statistical methods. Under the term "border courses" a directional field is to be understood which respective directional vectors represent the local border direction in each picture element.

Directly before the beginning of a new reference measurement the command sequence is transmitted per infrared signal or over the control lines of a bus system for initializing the apparatus to be controlled. Many video recorders may not be controlled by remote control commands for example during a timer programmed recording. In order to evade this safety mode there is a special remote control command for each apparatus which switches off this checking function. The recorder thereby leaves the timer programmed recording mode and is now to be operated in the manual recording mode. For this purpose the necessary control commands are emitted directly before the beginning of a new reference measurement.

Figure 1A:
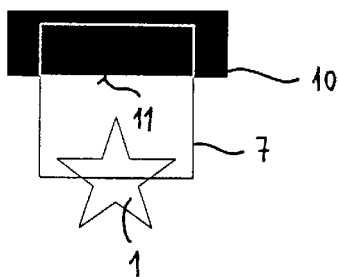
FIG. 1A, 1B is a schematic representation of a correction of the vertical position of a measuring section on the basis of blanking lines before the beginning of the reference measurement.
Figure 1B:
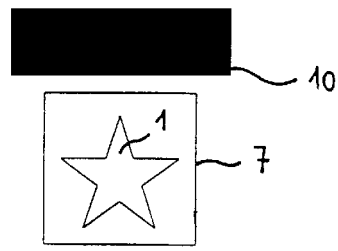
Figure 2:
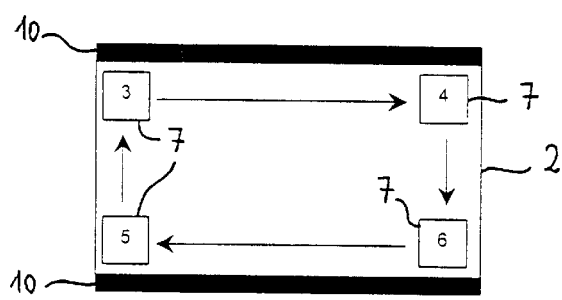
FIG. 2 is an exemplified representation of the cyclic corner sweep for the telestation emblem during the reference measurement by means of a monitor picture.

For the detection of a telestation emblem 1 (see FIG. 1) it is not necessary to examine the complete picture frame 2 (see FIG. 2). The telestation emblems 1 are principally arranged in the corners 3 to 6 of the visible picture. First of all, the corner 3, for example on the left side above, is determined as picture section 7 to be checked. If during a reference measurement no time-constant pattern could be found the next corner 4 becomes the active picture section 7, and a new reference measurement starts. This procedure is cyclically repeated according to FIG. 2 until a time-constant pattern could be detected within the reference measurement.

Thus, in contrast to the known prior art, there are not checked all picture corners 3 to 6 simultaneously, but a sequential search of the picture corner 3 to 6 for the telestation emblem 1 is performed according to the present invention resulting in a considerable saving of memory capacity.

Since the telestation emblem 1 in order to serve as detector for advertising identification is not completely to be detected in its border course directions a further storage reduction may be achieved by the selection of the correct size of the picture section 7. In practice dimensions of 90 lines×90 columns turned out to be a convenient size for the picture section 7.

The smaller however the selected dimensions, the more important is the correct positioning of the picture section 7 (see FIG. 1A, 1B). Since the vertical position of some telestation emblems 1 are adapted to the respective picture format of a TV-broadcasting (4:3, 16:9, etc.) there is also to be corrected the vertical position of the picture section 7 to be checked. For this purpose an examination of the black blanking lines 10 at the upper or lower picture border is necessary before every new reference measurement. If such blanking lines 10 exist these lines may be detected according to FIG. 1A by means of a horizontal border 11 extending through the entire actual picture section 7, wherein according to the just checked corner no further border courses are allowed to be present above or beneath this detected border 11 and the average brightness value has to be smaller than the brightness value in the remaining picture section. The actual picture section 7 is then corrected in correspondence with its vertical position (see FIG. 1B).

It is necessary for further processing within a calculating processor that the incoming video signal is present in digital form. In case of an analog video source a video decoder, also called picture processor, is used for this purpose which digitizes a picture region of the analog video signal upon command of a calculating processor, preferably a digital signal processor, and places same at the disposal of the calculating processor. For further processing the brightness values are recorded into a memory by the calculating processor in the form of a matrix. By addition of some brightness matrixes of the same picture section recorded one after the other and subsequent averaging, disturbances in the form of noise are considerably minimized. The brightness matrix resulting therefrom may serve as basis for the further analyzing process.

Example:

$$Ah[i][j] = \frac{1}{8}\sum_{n=1}^{8} Ah[i][j]$$

$Ah[i][j] :=$ element $i, j$ of the actual brightness matrix
$i :=$ line index
$j :=$ column index The first brightness matrix which has been formed by averaging several brightness matrixes read-in one after the other, has a special meaning. This matrix is copied as so-called reference matrix into another area of the storage and serves as comparison object for subsequent measurements. This reference matrix should be formed by a sufficient high number of averagings since this matrix represents an important starting basis for the continuation of the reference measurement.

Example:

$$Rh[i][j] = \frac{1}{64}\sum_{n=1}^{64} Ah[i][j]$$

$Rh[i][j] :=$ element $i, j$ of the reference – brightness matrix
$i :=$ line index
$j :=$ column index After storing the reference matrix a new brightness matrix is read-in, and the search for the telestation emblem starts.

For filtering the border course of a telestation emblem the reference measurement seeks for time-constant portions in the directional field of the actual picture section. Broadcastings the picture information of which is not changed over a longer time may however lead to incorrect results regarding the reference measurement. The rigid studio background for example during a news broadcast provides undesired border courses which are left over as time-constant portions after the reference measurement.

Therefore, a picture is only taken into consideration with respect to the reference measurement if the picture information thereof has discernibly been changed regarding the picture information of the foregoing picture. The read-in procedure is accordingly repeated as long as a change of the picture information could be determined.

A simple possibility for testing changes of the picture information of the actual picture with respect to the foregoing picture is the calculation of the average brightness variation E(D). If the average brightness variation E(D) falls below a certain threshold S, a static picture information can be assumed.

$$E(D) = \frac{\sum_{i,j} dij}{\sum_{i,j} 1} \text{ wherein: } dij = |[Ah[i][j]]_{n-1} - [Ah[i][j]]_n|$$

Figure 3:
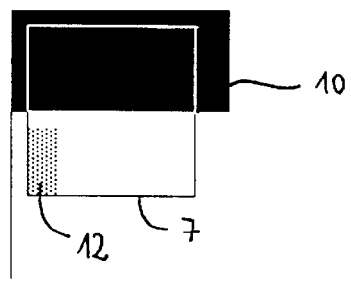
FIG. 3 is a schematic representation of the measuring region for the detection of changes with respect to the picture information during the reference measurement.
Figure 6:
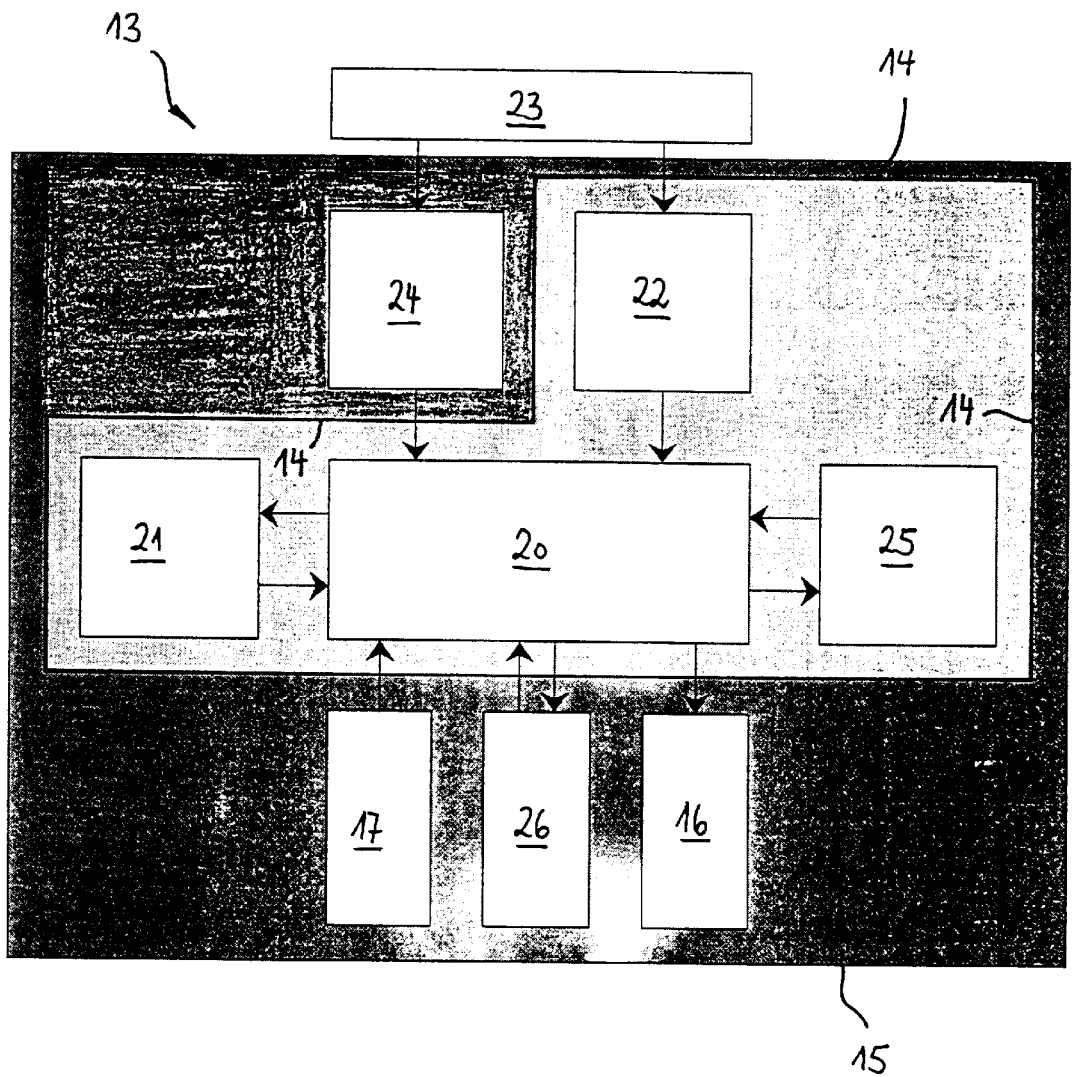
FIG. 6 is a block diagram of a device in the form an internal or external advertising blocker.
Figure 7:
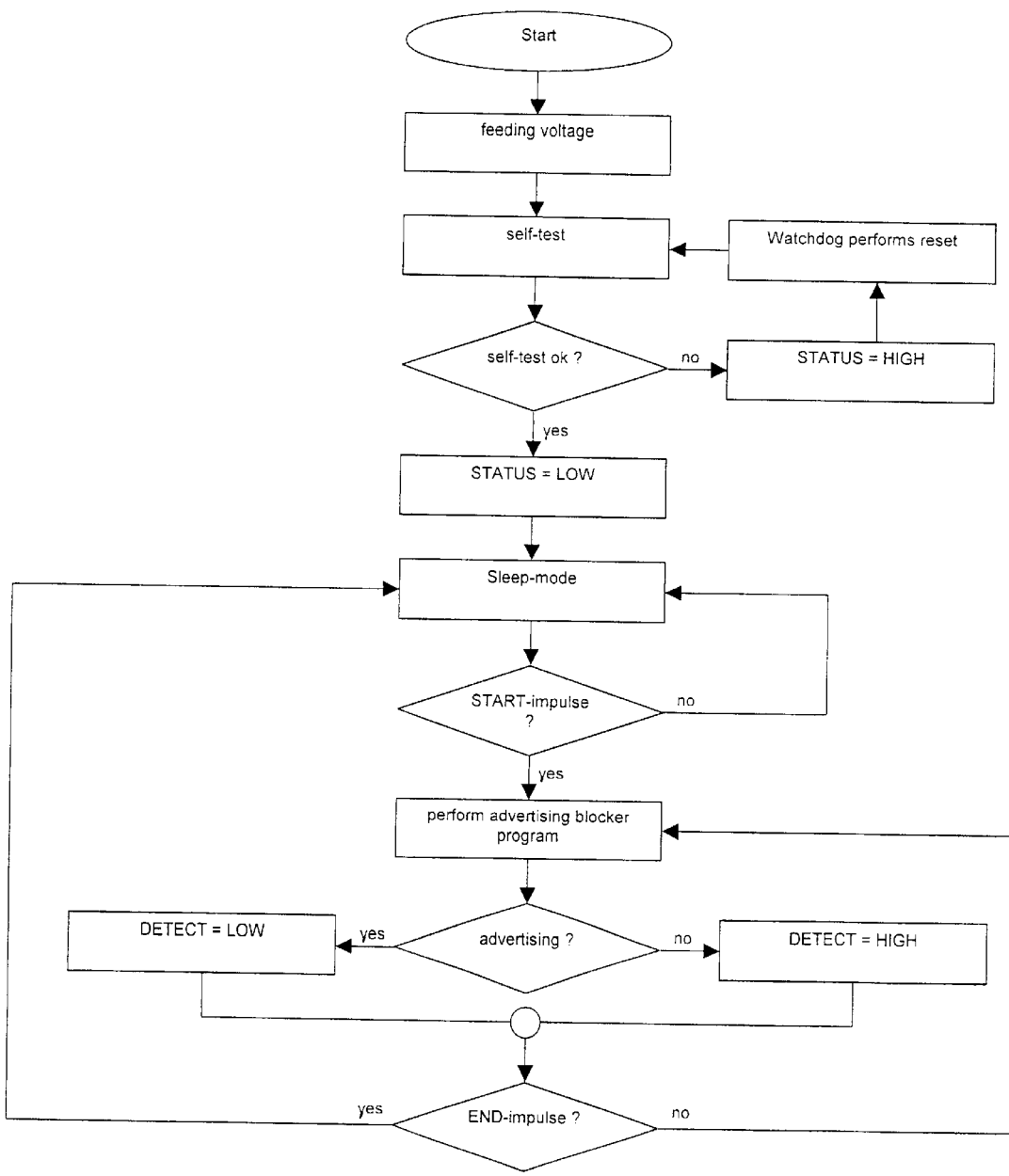
FIG. 7 is a flow chart for the starting procedure of the device in the form of an internal advertising blocker.

$E(D) < S \Rightarrow$ no change of picture information $[Ah[i][j]]_n :=$ element $i, j$ of the brightness matrix
of the actual picture $[Ah[i][j]]_{n-1} :=$ element $i, j$ of the brightness matrix
of the last valid picture The area of the blanking lines 10 remains disregarded since these lines may not show any changes of the picture information. Also the picture elements in which the telestation emblem 1 is not to be expected in all probability, should be excluded from the calculation. A further restriction results from the observation that in case of the already mentioned example of a news broadcast the head of the newscaster may temporarily extend into the area of the actual picture section 7 and that, therefore, picture changes would be detected in spite of a rigid studio background. As a result, only a small area 12 is left over for the examination with respect to changes of the picture information (see FIG. 3).

By means of so-called compass operators the respective border direction is determined in a certain picture element. A compass operator is a gradient operator which gives a statement about the drop of brightness in the environment of a picture element with respect to a certain direction. The strongest gradient values generally result perpendicular to the direction of a border course. Thus, it is the object to find the direction having the strongest drop of brightness for each picture element by means of the compass operators.

Example for 3×3 compass operators:

$$K1 = \begin{bmatrix} +1 & +1 & +1 \\ -1 & -1 & -1 \\ +0 & +0 & +0 \end{bmatrix} \quad K5 = \begin{bmatrix} +0 & +0 & +0 \\ -1 & -1 & -1 \\ +1 & +1 & +1 \end{bmatrix}$$

$$K2 = \begin{bmatrix} -1 & +1 & +1 \\ +0 & -1 & +1 \\ +0 & +0 & -1 \end{bmatrix} \quad K6 = \begin{bmatrix} -1 & +0 & +0 \\ +1 & -1 & +0 \\ +1 & +1 & -1 \end{bmatrix}$$

$$K3 = \begin{bmatrix} +0 & -1 & +1 \\ +0 & -1 & +1 \\ +0 & -1 & +1 \end{bmatrix} \quad K7 = \begin{bmatrix} +1 & -1 & +0 \\ +1 & -1 & +0 \\ +1 & -1 & +0 \end{bmatrix}$$

-continued $$K4 = \begin{bmatrix} +0 & +0 & -1 \\ +0 & -1 & +1 \\ -1 & +1 & +1 \end{bmatrix} \quad K8 = \begin{bmatrix} +1 & +1 & -1 \\ +1 & -1 & +0 \\ -1 & +0 & +0 \end{bmatrix}$$

The definition for the calculation of a gradient value Grad[n] in the direction n by means of a 3×3 compass operator reads:

$$Grad[n] = \left| \sum_{p=1}^{3} \sum_{q=1}^{3} Kn[p][q] \times Ah[i+p-2][j+q-2] \right|$$

wherein:

$$Kn = \begin{bmatrix} K_{11} & K_{12} & K_{13} \\ K_{21} & K_{22} & K_{23} \\ K_{31} & K_{32} & K_{33} \end{bmatrix}$$

wherein i designates the line index, j designates the column index, p designates the line index of the compass operator and q designates the column index of the compass operator.

The determined eight directional gradients Grad[n] of each picture element are sorted and evaluated according to their value.

The direction perpendicular to a border on principal provides the greatest gradient value. This direction is stored in the directional matrix Ar[i][j] (see FIG. 4) in form of a directional code.

Ar[i][j]=n wherein Grad[n]>=Grad[m] and n,m $\epsilon\{1, \ldots, 8\}$

Ar[i][j]:=element i, j of the actual directional matrix
i:=line index
j:=column index It is not always that the borders of a telestation emblem are determined by the determination of the strongest directional gradient. Particularly transparent emblems partly differ not sufficient from the picture background or are difficult to identify in a texture-rich background. Thus, the directional codes to be stored are additionally be analyzed according to the trustworthiness of their directional statement. Thus, a weighting factor for the respective elements of the directional field is determined and stored in a separate (actual) weighting matrix Ag. The weighting factors may for instance be determined by the difference of the two strongest directional gradients.

In the left picture of FIG. 5 (FIG. 5A) the gradient in the "direction 3" is for example remarkably stronger than in the right picture (FIG. 5B). This finally means that in this case the directional code should be given a higher power of evidence, in other words a higher weighting, with respect to statistical evaluations.

Ag[i][j]=g1-g2

Ag[i][D]:=element i, j of the actual weighting matrix
i:=line index
j:=column index
g1:=greatest directional gradient
g2:=second greatest directional gradient Three matrixes result therefrom which characterize the actual read-in picture section. The brightness matrix describes the luminance of the respective picture elements, the directional matrix the corresponding directional field and the weighting matrix the quality of the directional field elements with respect to statistical evaluations.

As for the actual read-in brightness matrix the directional and weighting matrix may also be determined for the reference matrix. Thus, the following matrix system results:

Ah:=actual brightness matrix
Ar:=actual directional matrix
Ag:=actual weighting matrix
Rh:=reference brightness matrix
Rr:=reference directional matrix
Rg:=reference weighting matrix In order to differ border courses of the telestation emblem in the stored reference matrix from borders of the picture background it is necessary to compare the directional fields of the actual incoming pictures with those of the reference picture over a longer period of time. Only time-constant patterns like the telestation emblem nearly remain constant regarding their respective border courses over the total duration of the reference measurement.

The directional deviation of an element of the actual directional matrix with respect to the same element of the reference-directional matrix is determined by the difference of the stored directional codes. The directional deviation $w_{ij}$ is here given in the form of an angle in units of 45 degree:

$$w_{ij}=|Rr[i][j]-Ar[i][j]| \text{ for } w_{ij} \leq 4$$

$$w_{ij}=8-|Rr[i][j]-Ar[i][j]| \text{ for } w_{ij} \geq 5$$

wherein Rr[i][j] and Ar[i][j] are defined as stated before.

The sum of all directional deviations which results over a certain number of measurements for one picture element, is a measure for the time-constancy of the directional field in this element. Over the number of n measurements an average directional deviation $E(w_{ij})$, also called expected value of the directional deviation, follows:

$$E(wij) = \frac{\sum_n wij}{n}$$

According to the present invention an improvement of this statistical statement is reached in that the different quality of the respective contributions $w_{ij}$ to the calculation of the average directional deviation $E(w_{ij})$ is taken into consideration as follows:

$$E(w_{ij}) = \frac{\sum_n w_{ij} \times g_{ij}}{\sum_n g_{ij}} \text{ wherein: } g_{ij} = Rg[i][j] \times Ag[i][j]$$

wherein Rg[i][j] designates the element in line i, column j of the reference-weighting matrix, and Ag[i][j] designates the element in line i, column j of the actual weighting matrix.

In order to be in a position to calculate this average directional deviation after n measurements the weighted angular sum $$\sum_n w_{ij} \times g_{ij}$$

as well as the sum of the weighting factors $$\sum_n g_{ij}$$

are to be stated in own matrixes.

$$W[i][j] = \sum_n w_{ij} \times g_{ij} \quad \text{(angular sum matrix)}$$

$$G[i][j] = \sum_n g_{ij} \quad \text{(weighting sum matrix)}$$

The average deviation $E(w_{ij})$ of the directional field vectors in a picture element after n measurements may thus be calculated from:

$$E(wij) = \frac{W[i][j]}{G[i][j]}$$

By means of the statement of a suitable threshold value S the time-constant portions of the directional field may therefore be determined at any point of time of the reference measurement. It follows:

$E(w_{ij}) <= S =>$ time-constant directional field element $E(w_{ij}) > S =>$ time-variant directional field element In order to derive the existence of the telestation emblem in the considered picture section, the geometric expansions of the time-constant directional field portion are not allowed to fall below a certain measure. As soon as the existence of a telestation emblem can be excluded by means of the dimensions of the time-constant directional field portion, a new reference measurement is started in a new picture section.

Before a new brightness matrix is read-in for further analysis the reference matrix Rh is further improved by addition to the actual brightness matrix Ah and subsequent averaging. Noise portions are minimized thereby and borders which do not belong to the possibly present telestation emblem, are already weakened in the reference-brightness matrix.

$$Rh[i][j] = \frac{n \times Rh[i][j] + Ah[i][j]}{n+1}$$

wherein: $n$ = number of measurements

The reference measurement is finished if a time-constant pattern could be identified after a predetermined number of valid measurements. If this is not the case, the reference measurement is repeated in a new picture section (see FIG. 2) as mentioned above. After a successful reference measurement the time-constant portions in the directional field of the reference matrix are characterized such that only these portions are considered in the subsequent test measurement for recognizing the time-constant pattern.

The test measurement serves for the detection of the telestation emblem found in the reference measurement for the purpose of advertising identification. For this purpose the digitized video signals of the same picture section are continuously read-in and analyzed according to FIG. 14 exactly as also with respect to the reference measurement. By comparison with the time-constant portions of the directional field resulting from the reference measurement the further presence or absence of the telestation emblem can be derived. For controlling a video recording in the beginning and at the end of an identified advertising sequence in this context corresponding control signals are transmitted to the recording device over a bus system or via an infrared transmitting unit.

In one of the non-visible video lines of a television picture information regarding the transmitter as well as the originally scheduled time of transmission of the actually emitted television broadcasting is transferred (PDC-line). In the beginning of the test measurement the information of this video line is read-in and stored in order to be in a position to detect the end of a television broadcasting to be recorded by permanent comparison with the actual data of this video line and to transmit a corresponding control command to the video recorder.

In case that the video recorder is controlled over the P50-log for the SCART-bus, also the timer data stored in the recorder are read-out and stored in the beginning of the test measurement. If the video recorder was not in a timer programmed recording these data may be generated for the purpose of the recorder controlling and may be transferred via SCART-bus. By manipulation of the timer stopping time the video recording may now purposefully be controlled. During this procedure the control logic of the recorder itself provides for the correct behavior when the timer stopping time is reached.

Beginning and end of an advertising sequence are generally characterized by a change in the picture information. On the one hand the telestation emblem appears or disappears, on the other hand the transition between advertising and film finally results to an exchange of the total picture information. Thus, only pictures are analyzed which are accompanied by a change with respect to the picture information.

Exactly like in the case of the reference measurement the average change of the brightness values of the last read-in picture and the actual picture may also be used for this purpose. In contrast to the reference measurement only the picture elements along the borders of the emblem are however considered this time which are based on the reference measurement. This is convenient because a change with respect to the picture information will be particularly clearly be determined at these locations by means of the appearing or disappearing of the telestation emblem.

In this connection the above mentioned equation is valid:

$$E(D) = \frac{\sum_{i,j} d_{ij}}{\sum_{i,j} 1} \text{ wherein } d_{ij} = |[Ah[i][j]]_{n-1} - [Ah[i][j]]_n|$$

$E(D) < S \Rightarrow$ no change of picture information $[Ah[i][j]]_n :=$ element $i$, $j$ of the brightness matrix of the actual picture $[Ah[i][j]]_{n-1} :=$ element $i$, $j$ of the brightness matrix of the last valid picture In order to test the presence of a telestation emblem the border courses of the actual picture are compared with those of the stored reference picture. A measure for the deviations of the border courses of the actual picture with respect to those of the stored reference picture results from the calculation of the average directional deviation which are formed by the respective elements of the actual directional matrix with respect to those of the reference-directional matrix. Like in the case of the reference measurement first of all a directional and weighting matrix is calculated from the brightness matrix.

The directional deviation of an element of the actual directional matrix with respect to the same element of the reference-directional matrix is determined by the difference of the stored directional codes. The directional deviation $w_{ij}$ is again stated in form of an angle in units of 45 degree:

$w_{ij} = |Rr[i][j] - Ar[i][j]|$ for $w_{ij} \leq 4$ $w_{ij} = 8 - |Rr[i][j] - Ar[i][j]|$ for $w_{ij} \geq 5$ In the reference measurement made before the time relevant changes of the directional field are considered in one picture element. After n measurements an average of $$E(w_{ij}) = \frac{\sum_n w_{ij} \times g_{ij}}{\sum_n g_{ij}}$$

wherein: $g_{ij} = Rg[i][j] \times Ag[i][j]$ results. In the test measurement the actual directional deviations of all those picture elements of the actual picture are now considered which follow from the reference measurement as being time-constant. The average of the directional deviations E(W) of all picture elements to be considered may be calculated from:

$$E(W) = \frac{\sum_{i,j} w_{ij} \times g_{ij}}{\sum_{i,j} g_{ij}}$$

wherein: $g_{ij} = Rg[i][j] \times Ag[i][j]$

The average weighting factor E(G) based on the picture elements to be considered may be calculated from:

$$E(G) = \frac{\sum_{i,j} g_{ij}}{\sum_{i,j} 1}$$

E(W) determines the deviations of the actual directional field with respect to the reference-directional field and may be interpreted as probability statement regarding the presence of the telestation emblem. The question whether an advertising sequence is actually emitted may be answered by a suitable threshold value. The status of the advertising identification is compared with the foregoing status and stored after each new evaluation. If the status is changed, a control command corresponding to the fact whether it is the beginning or the end of an identified advertising sequence, is emitted.

In practice it has been found that it is advantageous to work with two different threshold values, namely one threshold value for the identification of the beginning of the advertising and one threshold value for the identification of the end of the advertising.

Old status = film: $E(W) > S_1 \Rightarrow$ beginning of advertising

Old status = advertising: $E(W) < S_2 \Rightarrow$ end of advertising

E(G) is a measure for the quality of the statement based on E(W) about the presence of the telestation emblem. If E(G) is very small, this means that the question regarding the border course could not clearly been clarified for most of the examined picture elements. In those cases the old status of the advertising identification is maintained, and, thus, no control command is emitted.

In spite of the enormous reliability of the above described method incorrect decisions regarding the identification of an emblem may however occur from time to time, especially when the telestation emblem appears to completely or partly vanish in an identically colored or strongly texture-rich picture background. Because of this reason the identification of the beginning of an advertising spot may only then be regarded as being reliable if the sudden cessation of the telestation emblem could be confirmed in the directly following measurement. This procedure results to the fact that in connection with the above described test with respect to changes of the picture information even picture sequences which are difficult to analyze, can perfectly be mastered.

The telestation emblem could for instance disappear over a certain period of time in an identically colored picture background without the advertising identification making a misinterpretation since a further picture is analyzed and used for confirmation in connection with a discernible change of the picture information. The next picture which may be analyzed then however shows the telestation emblem in a new context in which it is to differ more clearly from the picture background. The above determined absence of the telestation emblem would thus not be confirmed.

The reliability of the evaluation of the method for identifying advertising spots according to the present invention rises up to nearly 100% by means of this procedure without essentially impairing the reaction rate.

The end of the test measurement may be released manually or automatically by comparison with the PDC-line information stored before. At the end of the test measurement a control command is emitted, if desired, and the total method for identifying advertising spots is finished.

In the following the circuit arrangement operating on the basis of this method and designed in the form of the device 13 according to the present invention for controlling an apparatus depending on the presence of advertising spots is described with respect to FIG. 6 to 14.

The device 13 preferably serves for controlling a video recording apparatus and follows up the purpose to identify advertising sequences already during the recording of a television broadcasting and in such a case to interrupt the video recording. The device 13 may be designed on the one hand like a structural component integrated into the video recorder (internal advertising blocker 14), on the other hand also like an additional device (external advertising blocker 15). The additional device is simply connected to the video output of the recorder and automatically takes over the recording control with the beginning of the recording. For this purpose the external advertising blocker 15 comprises as well an infrared transmitting unit 16 as an infrared receiving unit 17 by means of which any remote control command may be stored and again be issued depending on the advertising identification in a given moment.

Alternatively, controlling a video recorder is also possible over any standard bus system. A complete new idea results from the possibility that data may be exchanged via SCART-bus. According to the widespread P50-standard timer data of a video recorder may for example be read-out and also changed. By manipulation of the starting or stopping time of the recording, video recordings may purposefully be controlled.

In the following the components of such a device 13 for controlling a video recorder for the purpose of video recordings of TV broadcastings being free from advertisement are described. According to FIG. 6 it is differentiated between the mode of construction of an internal and external advertising blocker 14, 15.

A digital signal processor 20 is the central processing unit. Said unit serves for data analysis, for data recording and for generating control signals. A permanent storage 21, for example a so-called flash-storage, holds the data consisting of function code and stored infrared command sequences without needing any power source.

A picture processor 22, also called video decoder, is arranged between a video source 23 and the signal processor 20 and fulfills the following tasks: detection of a video source, digitizing and decoding analog video signals as well as video data acquisition of a desired picture section and synchronized output to the digital signal processor. It is apparent that the picture processor 22 may be omitted in case that digital signals of the video source 23 are present.

A video trigger 24 is arranged between the video source 23 and the signal processor 20 and, if the picture processor 22 is provided, is connected in parallel to this processor to the mentioned components. During the sleep-mode the video trigger 24 continuously monitors the status of the video source 23 and signalizes the actual status (active/inactive) to the digital signal processor 20 wherein a watchdog-switching circuit 25 connected to the signal processor 20 monitors the reset of the digital signal processor 20.

The infrared receiving unit 17 serves for detecting infrared signals of any remote control command and for transmitting same in digital form to the signal processor 20. This processor analyzes the received digital data and stores same in the permanent storage 21 in compressed form.

The infrared transmitting unit 16 is in a position to generate modulated infrared sequences from command signals of the signal processor 20. Digitally stored infrared command sequences are loaded for this purpose from the permanent storage 21 into the signal processor 20. Here the infrared command sequences are decoded and converted into control signals for the infrared transmitting unit 16. As well the video-trigger 24 as the infrared transmitting and infrared receiving unit 16, 17 are provided like a control panel 26 mentioned in the following only with respect to the external advertising blocker 15.

The control panel 26 is the user interface and comprises switches for the selection of the program mode (infrared (IR)-learning program, IR-test program, program for identification of advertisement) as well as calipers for the selection of the IR-storage location. As mentioned before, this component is only convenient with respect to an external advertising blocker 15.

The internal advertising blocker 14 (see FIG. 6) is a structural component integrated into a video recording apparatus not shown in detail, which structural component consists of the elements described before with respect to the external advertising blocker 15 except however the IR-units 16, 17 and the control panel 26. It is the purpose of the internal advertising blocker 14 to identify advertising sequences during the recording of a television broadcasting and to inform the video recording apparatus over a signal output accordingly. If necessary, this apparatus may then interrupt the video recording and may continue the recording at the end of the advertisement. With respect to the communication of advertising blocker, in the following shortly also called module, and video recorder, in the following it is not spoken about a standard bus system but about two special signal inputs and signal outputs, respectively.

At module input START the module (internal advertising blocker 14) being in the power saving sleep-mode is reactivated by an impulse of the video recorder, and the program for identifying advertisement is started.

At module input END the program for identifying advertisement is ended by an impulse of the video recorder, and the module is reset into the power saving sleep-mode.

At module output STATUS the functional readiness of the module is signalized.

At module output DETECT the identification status of the program for blocking advertisement is signalized to the outside. A controlling of the video recorder depending on the presence of advertisement is enabled thereby.

After feeding the power supply to the advertising blocker for the first time, a reset is performed by the implemented watchdog-circuit. Thereafter, the digital signal processor performs a self-test of the present components. If one of these tests fails, the signal processor signalizes the operating inability of the advertising blocker to the outside over the module output STATUS. After successful examination the internal advertising blocker is in a power saving sleep-mode from which it can be wakened by the video recorder over an impulse at the module input START at any time. After the START-impulse the program for identifying the advertising is performed until the advertising blocker is requested by the video recorder over an impulse at the module input END to finish the process for identifying advertisement, and the module is again set into the power saving sleep-mode thereby. During the running advertising identification program the status of the advertising identification is sent to the video recorder over the module output DETECT.

The external advertising blocker 15 is a device in the form of an additional device which is connected to the video output of any video source 23 and which comprises one or more possibilities for controlling the device. It preferably serves the purpose to identify advertising sequences during the recording of a television broadcasting and to inform the video recording apparatus or any other apparatus thereabout over a control bus or via infrared command sequences. This apparatus may then eventually interrupt the video recording and may continue same at the end of the advertising.

Figure 8:
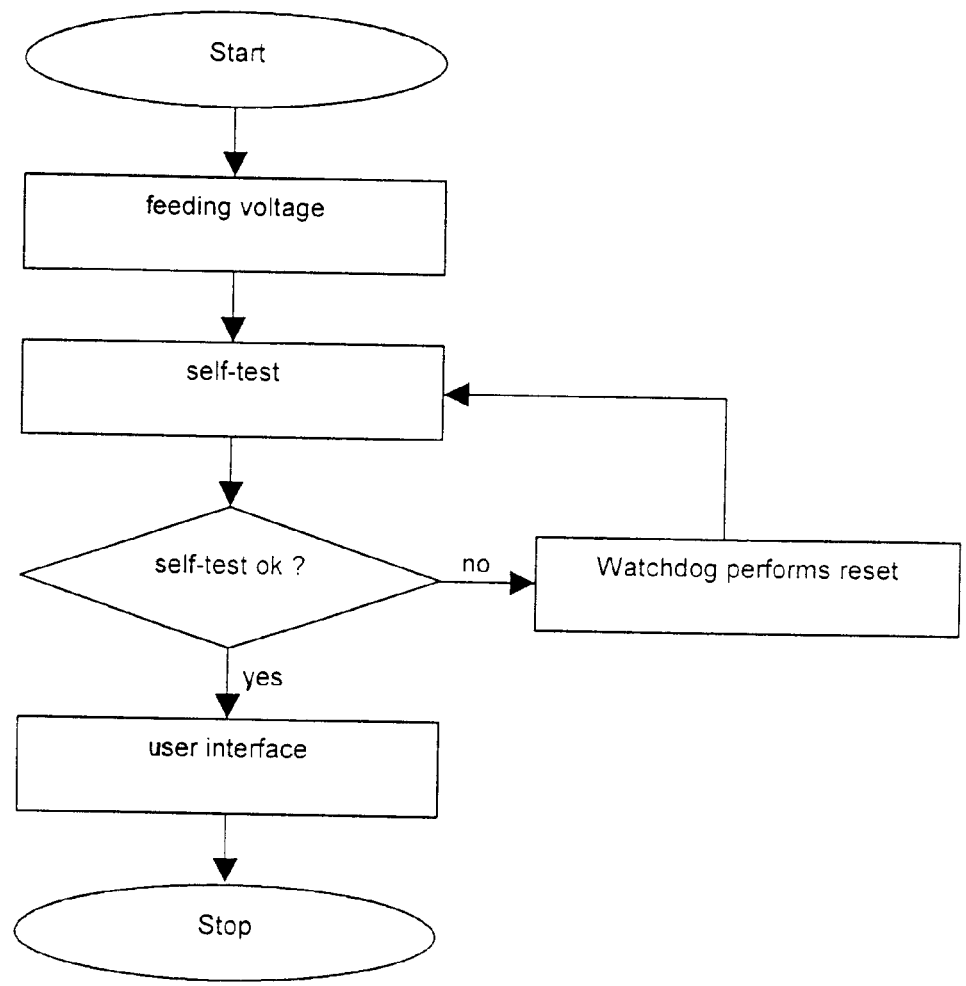
FIG. 8 is a flow chart for the starting procedure of the device in the form of an external advertising blocker.
Figure 9:
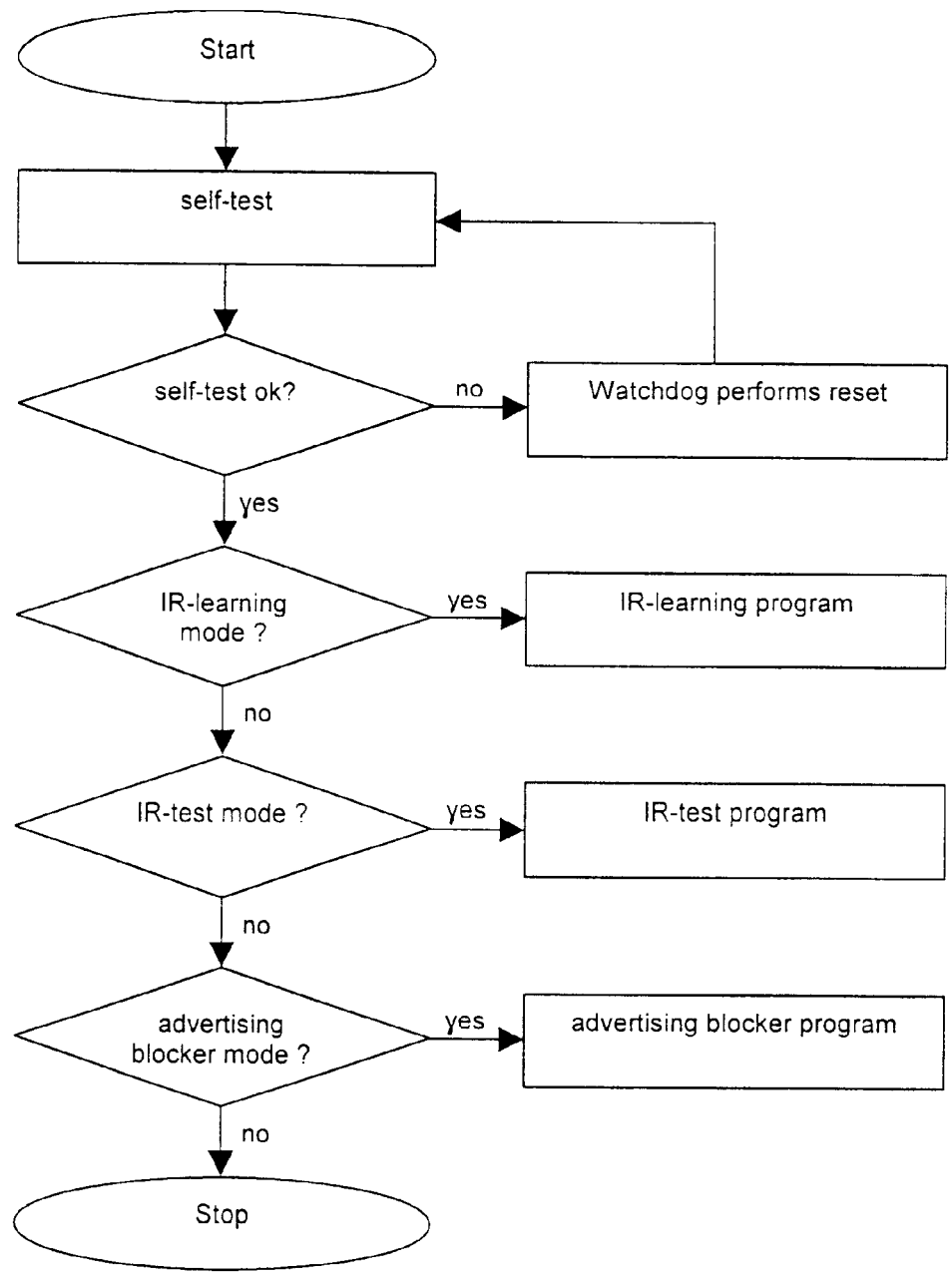
FIG. 9 is a flow chart regarding the user interface of the device in the form of an external advertising blocker.

After feeding the power supply to the advertising blocker for the first time, a reset is performed by the implemented watchdog-circuit according to the flow chart of FIG. 8. Thereafter, the digital signal processor performs a self-test of the present components. After the self-test the signal processor signalizes the functional status of the advertising blocker to the outside. During functional readiness of the external advertising blocker 15 three different programs, the IR-learning program, the IR-test program and the advertising identification program (see FIG. 9), may be selected through the control panel 26.

Figure 10:
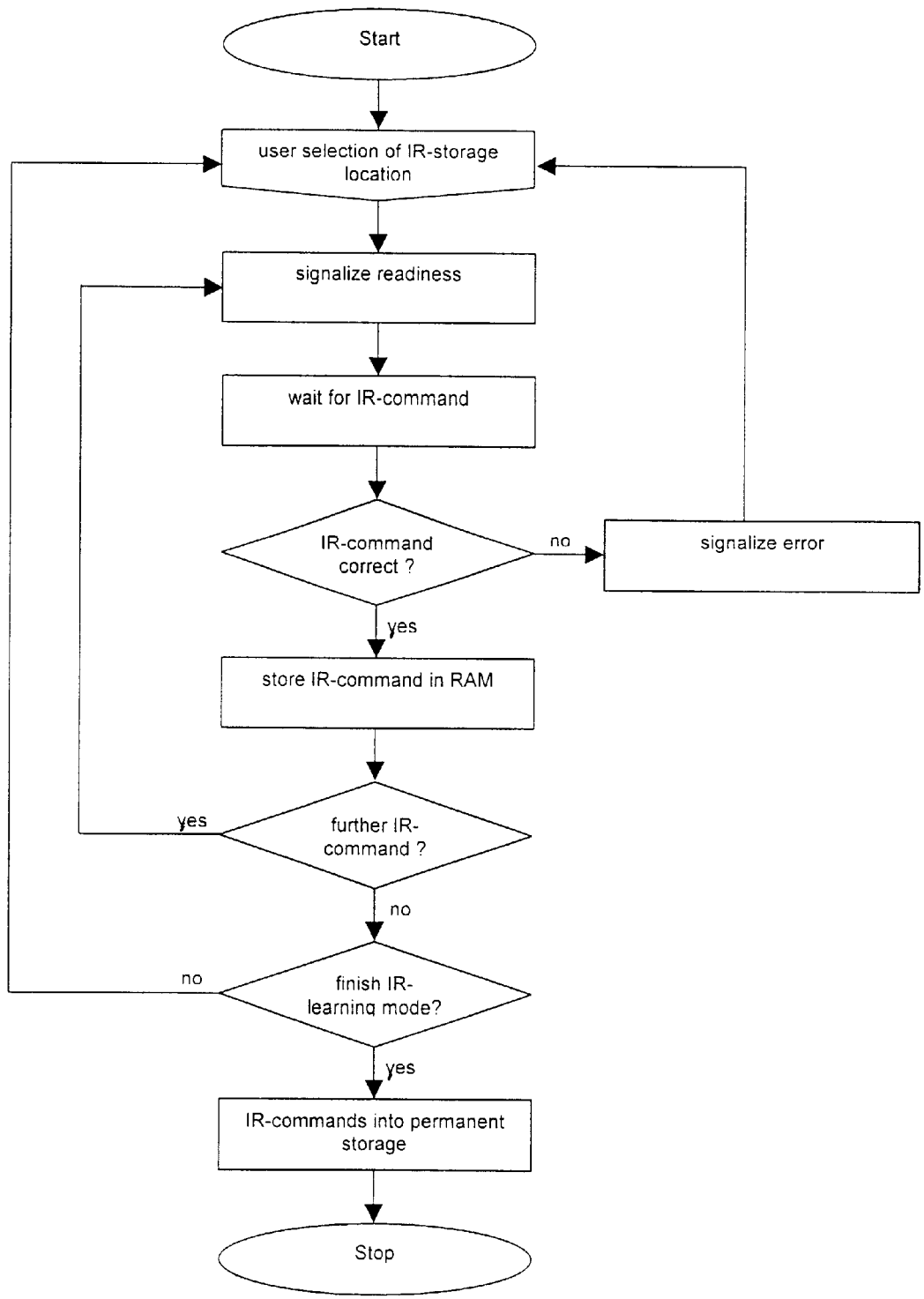
FIG. 10 is a flow chart for learning infrared remote control commands.
Figure 11:
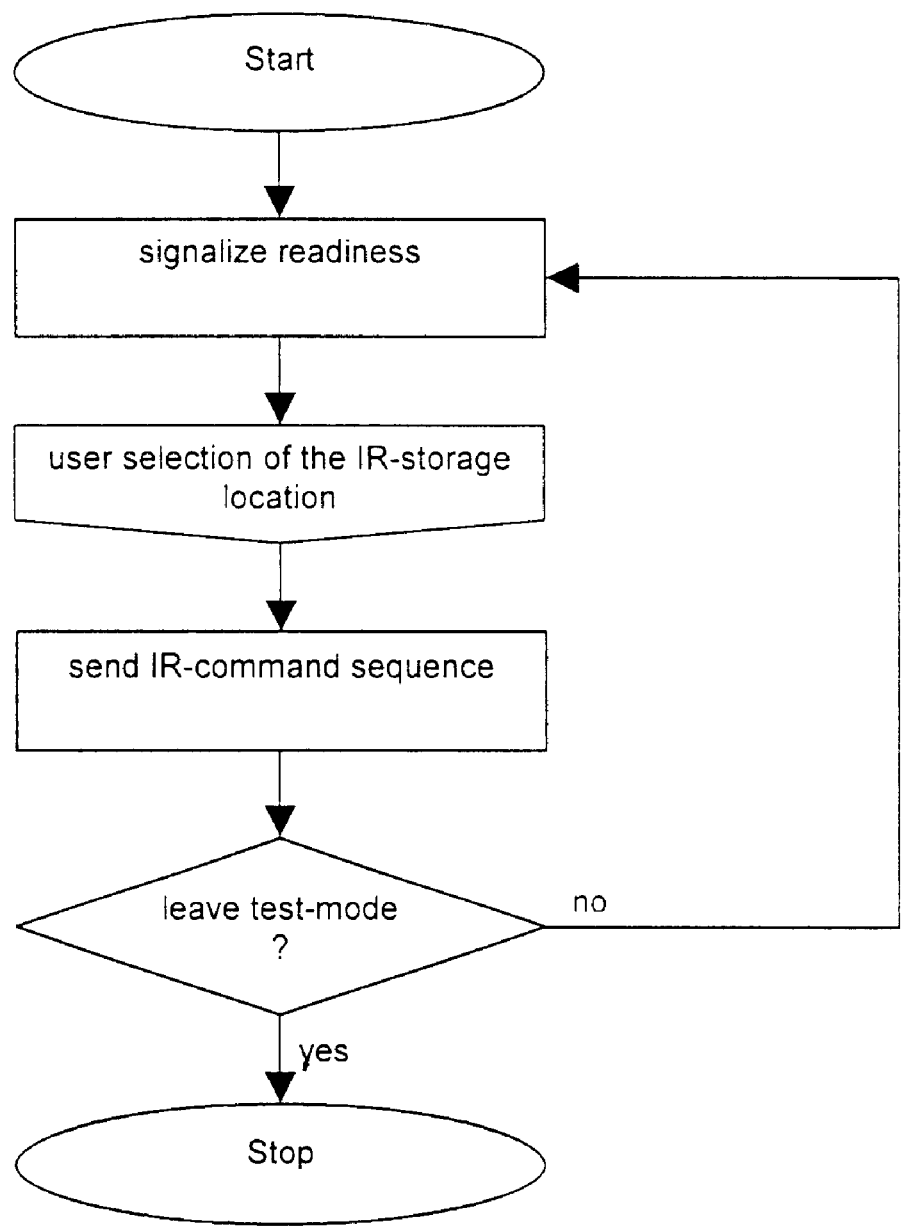
FIG. 11 is a flow chart for testing learned infrared remote control command sequences.
Figure 12:
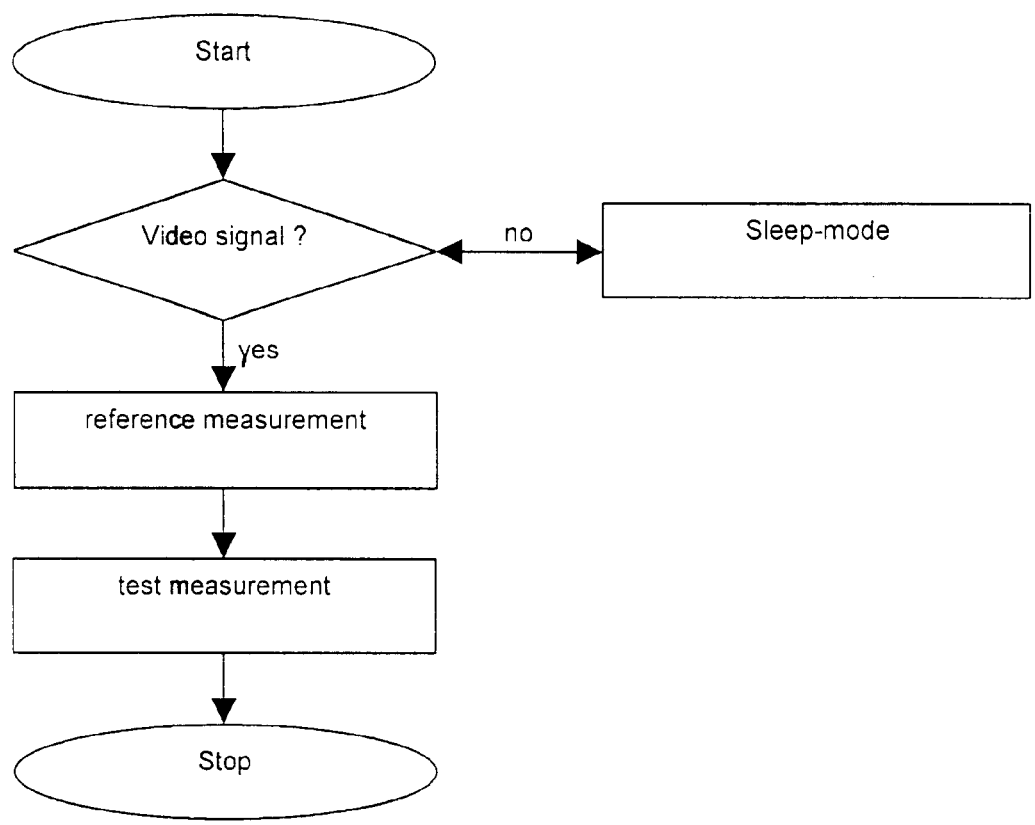
FIG. 12 is a flow chart with respect to the run of the advertising identification program.

The IR-learning program has the task according to FIG. 10 to analyze and store remote control commands of the specific video recorder for controlling a video recording. After starting, the IR-learning program waits for a user selection from one of the five storage locations for infrared command sequences. Each of these five storage locations is in a position to store at least one, preferably three, in case of the first storage location four different remote control commands since some actions require the output of several infrared commands. A recording start can often be performed only for example by the command sequence RECORD and PAUSE. In spite of fact that the video recorder should actually only start or interrupt the video recording, two storage locations are generally not sufficient for storing the respective remote control command sequences. In fact, a video recorder can normally only be controlled by the presence of the five memory locations for the reception of remote control commands as described below.

The first storage location is provided for the reception of TR-commands for initializing the video recorder. This initializing leads the video recorder from a possibly adjusted timer-programmed recording into the manual started recording mode by means of a special remote control command specific for the respective apparatus. Only in this status all disposable remote control commands of the video recorder may again be carried out. This initializing commands are emitted in the beginning of the reference measurement.

The second memory location for reception of the recording pause command is provided for the IR-commands which are emitted in the beginning of each identified advertising sequence. These commands serve for the interruption of a running video recording.

The third memory location is provided for the reception of IR-commands for the repetition of the recording interruption. This is necessary since most video recorders hold a recording interruption only for a certain period of time (about three minutes) and, thereafter, switch over into another operational status.

The forth memory location is provided for the reception of IR-commands for the continuation of an interrupted video recording.

The fifth memory location is provided for the reception of IR-commands for the final switching-off of the video recording.

As soon as the user selection of the storage location for the reception of remote control commands has been made the program signalizes its readiness. The learnable infrared signals of the remote control commands may now be digitized by the infrared receiving unit 17 and may be transmitted to the digital signal processor 20. The IR-learning program analyzes the received digital data, structures same and stores these data in compressed form in the permanent storage 21. If one of the received IR-commands could not correctly been received or processed, the control guide enforces a new input.

The IR-test program has the task to emit the remote control commands which have been stored before and which are specific for the respective video recorder, for controlling a video recording for testing purposes. After starting, the IR-test program according to FIG. 11 waits for a user selection for one of the memory locations for the infrared command sequences. The infrared command sequences digitally stored in a selected memory location are loaded from the permanent storage 21 into the digital signal processor 20. There, the infrared command sequences are decoded and converted into command signals for the infrared transmitting unit 16. The infrared transmitting unit generates modulated infrared sequences from the command signals of the signal processor.

The program for identifying advertising serves for the identification of advertising spots in TV-broadcastings by detection of telestation emblems as already described above. After starting the advertising identification program this program examines according to FIG. 12 if a valid video signal has been provided by the picture processor 22. If no valid video signal is present the advertising identification program transfers first of all the picture processor 22 and thereafter the digital signal processor 20 into a power saving sleep-mode. The video-trigger 24 takes over the permanent monitoring of the video source 23 in the sleep-mode and wakes the digital signal processor 20 out of the sleep-mode if valid video data are present. The advertising identification program is then accomplished until its final end, and the system is reset again into the sleep-mode.

In order to make possible improvements of the advertising identification program easy accessible several methods for updating the program versions are described in the following.

A certain emblem simultaneously appears in the four corners of the display during a special television advertising. The emblem signalizes the start of the beginning data transfer. Due to the identification of this starting emblem the advertising blocker switches itself into the update-mode and expects the reception of the program version to be updated in the form of certain black-white-patterns. Similar to the information transmission in the PDC-line, these data are analyzed and loaded into the permanent storage. The end of such transmission is accordingly signalized, and the update-mode is left. Alternatively, the program version to be updated may also be loaded onto a commercial video storage medium.

An updating via internet may more and more be presented with respect to the increasing propagation of this technology for updating the program versions. For this purpose the advertising blocker should also comprise a corresponding PC-interface, like for example RS232, CENTRONICS, USB, etc.

There is the additional possibility to improve the advertising identification by further parameters insofar that in cases in which an analysis of the telestation emblem should not be possible, another identification parameter is used. A possible identification parameter could for example be the sound level. Advertising spots in the television are obviously characterized by a higher loudness than the real program itself. In order to analyze the sound level an average sound level is continuously calculated during constant time portions and compared to a given threshold.

What is claimed is:

1. Method for detecting and identifying time-constant patterns in video signals of any video source, particularly for the detection of advertising spots in television broadcastings or the like transmissions, by video signal analysis and determination of video signals, like emblems, being specific for the respective telestation, characterized by the following steps:
    (a) after testing the activity of the video source at least one determined picture section is read-in into a storage in digitized form as brightness matrix;
    (b) the border courses of the actual picture section are determined in the form a directional field from the brightness matrix read-in before and are stored as directional field matrix;
    (c) by comparison of the directional field matrixes of subsequently read-in pictures of the same picture section with the stored directional field matrix the time-constant portions of the directional field are determined;
    (d) if a sufficient time-constant pattern could not be identified the method steps (a) to (c), in the following called reference measurement, are repeated with respect to a new picture section;
    (e) the time-constant portions of the directional field determined after the end of a certain number of comparison measurements are stored for reference as modified directional field matrix and are used for further comparison measurements;
    (f) by comparison of the directional field matrixes of subsequent pictures of the same picture section with the directional field matrix stored as reference the further presence or absence of the time-constant pattern is derived by means of statistical methods.

2. Method according to claim 1, characterized in that the statistical statement about the further presence of the time-constant pattern is determined from the sum of the deviations of the respective elements of the actual directional field matrix as against the reference-directional field matrix.

3. Method according to claim 1, characterized in that each element of the directional field matrixes is given a weighting factor such that these elements are taken into consideration in the statistical calculations with their respective weighting.

4. Method according to claim 1, characterized in that an examination of the actual picture section with respect to changes in the picture information takes place in such a way that picture sequences having nearly an unchanged picture information are not analyzed.

5. Method according to claim 4, characterized in that the disappearing or re-appearing of the time-constant pattern resulting from the reference measurement is only to be regarded as being present if the picture data of the directly following measurement confirm this status change.

6. Method according to claim 1, characterized in that updated evaluating algorithms may be used for performing the method as a result of a learning cycle or by external updating.

7. Method according to claim 1, characterized in that an audio signal is received in addition to the video signal, which audio signal is preferably evaluated on a digital signal processor in order to derive changes in the video signal from significant level and/or frequency differences.

8. Method according to claim 1, characterized in that a switching or control signal is provided on the basis of an identified advertising spot for affecting a connected apparatus, preferably a video recorder.

9. Use of a method according to claim 1 for finishing digitally or analogly stored video data by means of a personal computer or the like calculating device and/or for automatic logging of advertising spots.

10. Device for performing the method according to claim 1, characterized in that a digital signal processor connected to a video source is provided for data analysis, data storage as well as for controlling the input and output of signals, which processor is connected to a permanent storage for storing the function code and remote control command data and is designed in such a way that the processor performs a signal evaluation of picture sections based on a program stored in the permanent storage and provides a switching signal at its output.

11. Device according to claim 10, characterized in that if analog signals are present at the output of the video source a picture processor is switched between the video source and the signal processor, which picture processor is designed in such a way as to digitize, format and lead picture sections of the video signal of the video source to the signal processor after request of the signal processor.

12. Device according to claim 10, characterized in that the audio signal output of the video source is additionally connected to the signal processor.

13. Device according to claim 10, characterized by a connecting interface to the output of the video source; an output video interface; integrated infrared transmitting and receiving units for learning command sequences for controlling the device depending on identified advertising broadcastings; a watchdog-circuit for monitoring the reset; a video-trigger between the video source and the signal processor and, if a picture processor is provided, parallel thereto for transferring the device from a power saving standby or sleep-mode into an active status in case that relevant video signals are identified.

14. Device according to claim 13, characterized in that the infrared transmitting and receiving unit comprises several memory locations for the reception of infrared command sequences from which each storage location may store several infrared commands by means of the infrared receiving unit and may output same one after the other by means of the infrared transmitting unit.

15. Device according to claim 14, characterized in that five memory locations for at least one, preferably three command sequences in each case are provided, wherein the first memory location is provided for commands for initializing preferably a connectable video recorder over its IR-interface, the second memory location is provided for identification commands with respect to an advertising beginning, the third memory location is provided for commands for the repetition of the recording interruption of the recorder, the fourth memory location is provided for commands for the continuation of the interrupted video recording, and the fifth memory location is provided for commands for the final switching-off of the recording.

16. Device according to claim 13, characterized in that the infrared receiving unit is designed in such a way that this unit takes over remote control commands preferably for controlling the video recorder or a corresponding recording apparatus which are analyzed, structured and stored in a compressed form by means of the signal processor, wherein the test-mode for emitting commands stored before may be activated after a successful learning step.

17. Device according to claim 10, characterized in that a standard-bus system is alternatively provided for controlling an apparatus by means of infrared interfaces and infrared commands.

18. Device according to claim 17, characterized in that a data transfer is possible with a connected video recorder by means of the bus system such that for example the timer data of the video recorder are read-out and purposefully manipulated for the controlling of the recording.

* * * * *